3,528,839
BLACK PIGMENTS WITH SPINEL STRUCTURE
Horst Weber, Leverkusen, Germany, assignor to Farbenfabriken Bayer Aktiengesellschaft, Leverkusen, Germany, a corporation of Germany
No Drawing. Filed Mar. 14, 1967, Ser. No. 622,935
Claims priority, application Germany, Mar. 23, 1966, F 48,734
Int. Cl. C09c 1/22, 1/34
U.S. Cl. 106—304           7 Claims

ABSTRACT OF THE DISCLOSURE

Black pigments containing copper, chromium and iron oxide with spinel structure having the following composition in atomic weight ratios of $$Cu/(Cr+Fe) = 0.25-0.5$$
$$Fe/Cr = 0-0.5$$

and a mean particle size of below $0.5\mu$ and a process for their production, wherein a mixture containing copper, chromium, iron and boron having a composition with the following atomic weight ratios $$Cu/(Cr+Fe) = 0.25-0.5$$
$$Fe/Cr = 0-0.5$$
$$B/(Cu+Cr+Fe) = 0.001-0.1$$
$$Na/B = 0.1-1$$

said elements being in the form of their oxides or compounds forming oxides under the process conditions, is calcined to a temperature of from 1000 to 1200° C. for at least half an hour, thereby forming said black pigments with spinel structure and dis-agglomerating, i.e. grinding, washing and drying the calcined mixture for finishing.

---

The present invention relates to black pigments of the copper-chromium-iron oxide system having a spinel structure, and to a process for the manufacture thereof.

Block colored bodies of the copper-chromium-iron oxide system having a spinel structure are already known and are used for coloring, for example, enamels and ceramic glazes. They are produced by calcining a mixture of copper oxide, chromium oxide and iron oxide, or of oxide-forming compounds of the said metals, at about 1150 to 1300° C. However, the products have the disadvantage when used in pigments, e.g. for the coloring of lacquers or synthetic plastics, of only being dispersible with extreme difficulty as their particle sizes are much too large (greater than $1\mu$). Furthermore dispersions thereof are unstable, the color is unsatisfactory in being too brown, and their covering capacity is too low. An improvement in the quality of the pigments cannot be achieved by intensive grinding. It is therefore necessary to reduce the primary particle sizes by means of more gentle calcining conditions, however, it has been found that under gentle calcining conditions, the spinel compounds of the system under consideration are sensitive to grinding, i.e. with the necessary grinding, the coloring thereof becomes weak.

It is an object of the present invention to provide new black pigments with spinel structure having high tinting strength suitable for lacquers, resins, ceramics, enamels and the like. It is another object of the present invention to provide black pigments with spinel structure having a mean particle size of below $0.5\mu$. It is still another object of the present invention to provide black pigments with spinel structure, the particles of which have an extraordinary grinding stability. It is a further object of the present invention to provide black pigments with spinel structure which are extremely stable at high temperatures. It is another object of his invention to provide a highly economic process for the production of said black pigments. Still further objects are described in the foregoing and following parts of the description.

It has now been found that spinel compounds of the copper-chromium-iron oxide system as defined herein, i.e. black pigments containing copper, chromium and iron oxide with spinel structure, having a mean particle size of less than $0.5\mu$, a high coloring power, and an outstanding grinding resistance, can be obtained by calcining a mixture of oxides of copper, chromium, iron, boron and sodium or of compounds of these elements which form oxides under the reaction conditions, said mixture having the atomic weight ratios of $$Cu/(Cr+Fe) = 0.25-0.5$$
$$Fe/Cr = 0-0.5$$
$$B/(Cu+Cr+Fe) = 0.001-0.1$$
$$Na/B = 0.1-1.0$$

for at least half an hour at temperatures from 1000 to 1200° C. triturating the calcined material in a vibrating or rotating mill, washing, drying and if desired disagglomerating by a second grinding step.

The products obtained by this process have a composition with the atomic weight ratios:

$$Cu/(Cr+Fe) = 0.25-0.5$$
$$Fe/Cr = 0-0.5$$

The X-ray powder diagram shows the following $d$-values, i.e. diffraction values (in angstrom units; relative intensitives in parentheses).

$$4.75 \pm 0.1 \ (5)$$
$$2.95 \pm 0.1 \ (30)$$
$$2.5 \pm 0.1 \ (100)$$
$$2.1 \pm 0.1 \ (10)$$
$$1.7 \pm 0.1 \ (7)$$
$$1.6 \pm 0.1 \ (30)$$
$$1.5 \pm 0.1 \ (35)$$
$$1.3 \pm 0.1 \ (7)$$

In addition the composition obtained has a mean particle size which is below $0.5\mu$ and in admixture with the same quantities by weight of a $TiO_2$ (rutile) white pigment embedded in an organic medium, the mixture shows a brightness according to DIN 5033 or ASA-Z 58.7.1-3 (1951) of below 12%. The pigment composition withstands grinding, is easily dispersed in both aqueous and organic media and is resistant to oxidizing or reducing agents and even to concentrated acids and caustic solutions. Its light-fastness and resistance to weathering is excellent and it is stable at temperatures above 1000° C. The pigments are particularly superior in their utility compared with conventional black pigments (carbon blacks, black iron oxide, organic black elements), in that they show no tendency to migration, bleeding out or flocculation and are suitable both for electrophoretic lacquering and also for use as corrosion-reducing agents in lacquer primers.

Suitable starting materials for use in the preparation of the products according to the present invention are oxygen-containing compounds such as cupric oxide (CuO), chromium sesquioxide ($Cr_2O_3$) and ferric oxide ($Fe_2O_3$) or compounds of the said metals which are converted on heating into the oxides, for example, the chromates, carbonates, nitrates, sulfates and hydroxides. Sodium and boron are preferably used in the form of sodium borates such as borax or sodium metaborate.

However, compounds of boron themselves, such as boron trioxide or boric acid, can be employed jointly with compounds of sodium (e.g. sodium hydroxide, sodium carbonate, sodium nitrite, sodium nitrate, sodium dichromate) etc.

The mixing can be effected by the dry or wet method. Wet mixtures must be dried before the calcining takes place.

The annealing of the initial mixtures can take place in capsules or in loose form in conventional chamber, drum, muffle or rotary furnaces. Care should be taken that there is always an oxidizing atmosphere, in order to avoid reduction. The mean primary particle size of the pigments depends essentially on the annealing temperature. For instance, at 1000 to 1050° C., average primary particle size of about 0.05 to $0.1\mu$ are found, these sizes being about 0.1 to $0.2\mu$ at 1050 to 1150° C. and about 0.2 to $0.5\mu$ at 1150 to 1200° C. If the calcining process is carried out at temperatures below about 1000° C., then the products formed have a lower grinding stability, while at temperatures above about 1200° C., the color strength is considerably reduced. The calcining time also has a substantial influence on the product, even if to a lesser degree than temperature. In order to obtain good quality products, the temperature treatment should last at least half an hour and preferably 1 to 5 hours.

The wet grinding of the calcined material in which the primary particles exist in an agglomerated state, is carried out in a rotating or vibrating mill using cylindrical grinding bodies. In contrast to the usual ball grinding procedure, it is possible to obtain a completely disagglomerated product. 0.5 to 1 part by weight of an inert liquid, preferably water and 1 to 10 parts by weight of grinding bodies are preferably used per part by weight of the calcined material, the grinding bodies consisting, in particular, of steel, sintered zirconium silicate or aluminum oxide. The grinding takes place until the coloring power has reached an optimum value and does not change if the grinding is continued. The necessary grinding times are about 5 to 10 hours when using the mill at normal working efficiency. When carrying out the wet grinding process, the product is triturated while substantially avoiding a punctiform pulse exchange between agglomerates and grinding bodies, this being advantageously achieved in mills in which cylindrical grinding bodies vibrate at high frequency.

The products of the grinding are now washed in order to remove any adhering salts, and are then dried. Like many other finely divided substances, the present products also tend during the drying to undergo some agglomeration, but this can be broken up by a subsequent impact grinding, for example in a conventional jet mill, pin mill, airstream mill or some other type of impact mill.

In order that the invention may be more fully understood the following examples are given by way of illustration only.

EXAMPLE 1

80 g. of copper oxide CuO, 152 g. of chromium oxide $Cr_2O_3$, 40 g. of iron oxide $Fe_2O_3$ and 8 g. of sodium borate $Na_2B_4O_7$ were mixed, with addition of 250 ml. of water, in a ball mill to form a homogeneous suspension, which had the following composition in respect of atomic weight ratios:

Cu/(Cr+Fe)=0.4
B/(Cu+Cr+Fe)=0.05
Fe/Cr=0.25
Na/B=0.5

This suspension was dried. The dry material was introduced into a ceramic capsule and calcined for two hours in air at 1100° C. in a muffle furnace. The calcined material was ground with 1000 g. of cylindrical $Al_2O_3$ grinding bodies and 200 ml. of water in a rotating mill for 10 hours, then washed and dried. The product had a composition with the atomic weight ratios of Cu/(Cr+Fe)=0.4 and Fe/Cr=0.25 when an X-ray powder analysis was carried out, the interferences ($d$-values) obtained were those indicated in the X-ray powder diagram list noted above. The means particle size was about $0.1\mu$ and a brightness according to DIN 5033 or ASA–Z 58.7.1–3 (1951) of 9.8% was obtained on embedding the pigments in soft PVC with the same quantity by weight of a $TiO_2$ rutile pigment and with a fully covering layer.

EXAMPLE 2

480 kg. of copper oxide, 915 kg. of chromium oxide, 240 kg. of iron oxide ($Fe_2O_3$) and 50 kg. of sodium borate ($Na_2B_4O_7$) were mixed in a ball mill, together with 1500 litres of water to form a homogeneous suspension having a composition corresponding to the atomic weight ratios of Cu/(Cr+Fe)=0.4
B/(Cu+Cr+Fe)=0.05
Fe/Cr=0.25
Na/B=0.5

This suspension was dried. The dry material was introduced into a gas-heated rotary furnace with a ceramic lining and was calcined for 5 hours at 1120° C. in an oxidizing atmosphere. The calcined material was ground preliminarily with 1200 litres of water in a ball mill, was introduced into a stirrer-type container and, with circulation caused by pumping, was ground for 24 hours in a vibrating mill containing 5000 kg. of $ZrSiO_4$ grinding cylinders and containing a volume of about 500 kg. of the spinel product to be ground. The ground suspension was washed, dried and ground in an impact mill.

The product was formed in a quantity of 1600 kg. and had a composition corresponding to the atomic weight ratios of Cu/(Cr+Fe)=0.4 and Fe/Cr=0.25. The interference values ($d$-values) obtained by X-ray powder exposures were those indicated in the X-ray powder diagram list noted above, and the mean particle size was about $0.15\mu$. When the pigment was embedded in soft PVC together with the same quantity by weight of a $TiO_2$ rutile pigment and with a completely covering layer, a brightness according to DIN 5033 or ASA–Z 58.7.1–3 (1951) of 10.3% was obtained.

I claim:
1. Black pigments of the copper-chromium-iron oxide system with spinel structure having the following composition in atomic weight ratios:

Cu/(Cr+Fe)=0.25–0.5
Fe/Cr=0.25–0.5 and at least showing the following X-ray diffraction values (in angstrom units):

4.75±0.1
2.95±0.1
2.5±0.1
2.1±0.1
1.7±0.1
1.6±0.1
1.5±0.1
1.3±0.1 said pigments having a mean particle size of below 0.5μ and, when admixed with equal quantities by weight of a $TiO_2$ rutile pigment and embedded in an organic medium, showing a brightness according to DIN 5033 and ASA-Z 58.7.1-3 (1951) of below 12%.

2. Process for the production of black pigments of the copper-chromium-iron oxide system with spinel structure with the following composition in atomic weight ratios $$Cu/(Cr+Fe)=0.25-0.5$$
$$Fe/Cr=0.25-0.5$$

and at least the following X-ray diffraction values (in angstrom units)

$$4.75\pm0.1$$
$$2.95\pm0.1$$
$$2.5\pm0.1$$
$$2.1\pm0.1$$
$$1.7\pm0.1$$
$$1.6\pm0.1$$
$$1.5\pm0.1$$
$$1.3\pm0.1$$

and a mean particle size of below 0.5μ which comprises calcining a mixture having a composition with the following atomic weight ratios $$Cu/(Cr+Fe)=0.25-0.5$$
$$Fe/Cr=0.25-0.5$$
$$B/(Cu+Cr+Fe)=0.001-0.1$$
$$Na/B=0.1-1.0$$

in the form of the corresponding compounds selected from the group consisting of the oxides of the foregoing elements and compounds of the foregoing elements which are converted on heating into such oxides, for at least one half an hour at temperatures of about 1000 to 1200° C. thereby forming said black pigments with spinel structure and finishing said pigment by grinding, washing and drying.

3. Process according to claim 2, wherein said mixture is composed of oxygen containing compounds selected from the group consisting of oxides, chromates, carbonates, nitrates, sulfates, and hydroxides of copper, chromium and iron; sodium borates; and mixtures of boron trioxide or boric acid with sodium hydroxide, carbonate, nitrite, nitrate or dichromate.

4. Process according to claim 2, wherein the boron in said mixture is present in the form of a compound selected from the group consisting of borax and sodium metaborate.

5. Process according to claim 2, wherein said mixture is calcined for about 1 to 5 hours.

6. Process according to claim 2, wherein said calcined mixture is ground with the addition of water in an amount between about 0.5 to 1.0 part by weight of water per part by weight of said calcined mixture.

7. Process according to claim 2, wherein about 1 to 10 parts by weight of grinding bodies are used per part by weight of the calcined mixture during grinding.

References Cited

UNITED STATES PATENTS

| | | | |
|---|---|---|---|
| 1,941,990 | 1/1934 | Lindstrom. | |
| 2,156,451 | 5/1939 | Grasshoff et al. | 106—302 |
| 2,248,021 | 7/1941 | Geary | 106—302 |
| 2,264,749 | 12/1941 | Geary | 106—302 XR |
| 2,309,173 | 1/1943 | Diehl | 106—302 |
| 3,046,150 | 7/1962 | Jamieson | 106—304 XR |
| 3,201,270 | 8/1965 | Carpenter | 106—302 |

FOREIGN PATENTS 487,078   6/1938   Great Britain.

OTHER REFERENCES

Norton: Elements of Ceramics, Addison-Wesley Press, Inc., Cambridge, Mass. (1952), pp. 197–199.

TOBIAS E. LEVOW, Primary Examiner

H. M. S. SNEED, Assistant Examiner

U.S. Cl. X.R.

106—39, 302; 260—37